US006268051B1

(12) United States Patent
Tsunemi et al.

(10) Patent No.: US 6,268,051 B1
(45) Date of Patent: Jul. 31, 2001

(54) IMAGE FORMATION APPARATUS USING A LIQUID TONER

(75) Inventors: Koichi Tsunemi, Chofu; Masahiro Hosoya, Okegawa, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/393,676

(22) Filed: Sep. 10, 1999

(30) Foreign Application Priority Data

Sep. 22, 1998 (JP) ........................................ 10-268416

(51) Int. Cl.7 ........................................ B32B 5/16

(52) U.S. Cl. .......................... 428/323; 428/328; 428/332; 428/411.1; 428/446; 428/447; 428/492; 399/297; 399/299; 399/302; 399/303; 399/308; 399/314

(58) Field of Search .................................... 428/323, 328, 428/332, 411.1, 446, 447, 492, 923, 926; 399/297, 299, 302, 303, 308, 313

(56) References Cited

U.S. PATENT DOCUMENTS

| | | | | |
|---|---|---|---|---|
| 5,298,956 | | 3/1994 | Mammino et al. | 399/308 |
| 5,592,269 | | 1/1997 | Younes et al. | 399/237 |
| 5,608,503 | * | 3/1997 | Fujiwara et al. | 399/302 |
| 5,745,831 | * | 4/1998 | Nakazawa et al. | 399/308 |
| 5,774,775 | * | 6/1998 | Aoto et al. | 399/308 |
| 5,802,442 | * | 9/1998 | Konno et al. | 399/308 |

* cited by examiner

*Primary Examiner*—Leszek Kiliman
(74) *Attorney, Agent, or Firm*—Oblon, Spivak, McClelland, Maier & Neustadt, P.C.

(57) ABSTRACT

An image formation apparatus comprising a photosensitive body and a transfer medium receiving an image made of a liquid toner formed on the photo-sensitive body and further transferring the image to an image formation medium. The transfer medium has a structure in which a conductive rubber layer and a polymer surface layer made of a silicone resin containing a conductive metal oxide are formed on a surface of a roller main body, and has surface resistance of 10E10 Ω/□ or less.

30 Claims, 2 Drawing Sheets

IMAGE FORMATION APPARATUS USING A LIQUID TONER

BACKGROUND OF THE INVENTION

The present invention relates to an electro-photographic image formation apparatus using a liquid toner.

The electrophotographic image formation apparatus has been reevaluated in recent years since the apparatus has the following advantages as compared to the apparatus using a solid toner. More specifically, extremely small particles of a sub-micron order can be used as toner particles, so that a high quality image equal to, e.g, an off-set printing level, can be realized. Furthermore, an image can be obtained with a sufficient density by fixing a small amount of the liquid toner on a paper sheet at a relatively low temperature, it is therefore possible to realize an economical and energy-saving apparatus.

FIG. 1 shows an electrophotographic image formation apparatus using a liquid toner. Now, we will explain a case where a full color image is formed using four color liquid toners. In FIG. 1, a photosensitive drum 1 is constituted by forming an organic or an amorphous silicon photosensitive layer on a drum formed of a conductive base body. After the photosensitive drum 1 is uniformly charged by a first charger 2*a*, a first light exposure 3*a* is performed corresponding to a modulated image, with the result that a first electrostatic latent image is formed on the surface. Thereafter, the electrostatic latent image is developed by a developing apparatus 4*a* storing a first liquid toner. Subsequently, the photosensitive drum 1 is charged by a second charger 2*b* and subjected to a second light exposure 3*b*. In this manner, a second electrostatic latent image is formed. The second electrostatic latent image is then developed by a second developing apparatus 4*b*. Third and fourth development processes are further performed in the same manner as above. Finally, a full color toner image is formed on the photosensitive drum 1. The toner image formed on the photosensitive drum 1 is transferred to a transfer medium 5 by application of an electric field. The toner image transferred onto the transfer medium 5 is further transferred onto a paper sheet 7 fed between the transfer medium 5 and a pressure roller 6. Before a next image formation process, the toner remaining on the photosensitive drum 1 is removed by a cleaner 8. As described, the transfer medium 5 has a function of receiving the toner developed on the photosensitive drum 1 and transferring the toner to an image formation medium such as a paper sheet.

In the meantime, a printing press employed in the printing industry is suitable for use in printing a number of identical images by using an original plate. In a case of the off-set printing, an image (ink layer) formed on a flat plate is transferred to a blanket serving as a transfer medium and further transferred from the blanket to an image formation medium, such as a paper sheet, to thereby obtain a printed matter. In this case, no electric field is applied between the flat plate and the blanket. In addition, since entirely identical printed matters are obtained, offset ink is not necessarily transferred to the blanket with a transfer efficiency of 100%. Accordingly, the blanket may well have a necessary ink release property, so that endurance is required as the most important property.

In contrast, in an image formation apparatus called "on-demand type" for printing a different image on each paper sheet, the image transfer must be performed always with a transfer efficiency of 100% since a different image is output on each paper sheet. Alternatively, toner remaining on the transfer medium must be removed by performing a cleaning operation before a next image transfer process.

In a conventional electrophotographic image formation apparatus using a liquid toner as shown in FIG. 1, used is the transfer medium which is formed of an inner layer formed of a conductive rubber layer and a surface layer formed of a silicone-based binder resin filled with an insulating filler.

However, in the case of the transfer medium of this type, when the toner image on the photosensitive drum is transferred to the transfer medium by application of the electric field, a transfer efficiency close to 100% cannot be obtained since a sufficient electric field is not applied to the high-resistance surface layer due to the presence of the insulating filler. Since a carrier solvent for the liquid toner is attached to the transfer medium, the attached solvent permeates into the underlying conductive rubber layer if the surface layer has a high absorbency of the solvent. As a result, the overall structure of the surface layer and the conductive rubber layer swells, with the result that dimensional change, for example, change in rubber thickness, occurs. In addition, mechanical strength reduces, with the result that the surface layer is sometimes peeled off. Such a mechanical deformation causes inconsistencies in density in the transferred image and is responsible for poor image quality.

BRIEF SUMMARY OF THE INVENTION

An object of the present invention is to provide an image formation apparatus having a transfer medium excellent in transfer property, dimensional stability, and mechanical strength, for forming a high-quality image.

The image formation apparatus of the present invention has a photosensitive body and a transfer medium receiving a liquid toner image formed on the photosensitive body and transferring the liquid toner image to an image formation medium, in which the transfer medium has a polymer surface layer, the polymer surface layer has a backbone comprising a siloxane structure, and surface resistance of the polymer surface layer is 10E10Ω/□ or less.

The transfer medium of the present invention is responsible for receiving the liquid toner image formed on the photosensitive body and transferring the image to the image formation medium. The transfer medium has a polymer surface layer, the polymer surface layer has a backbone comprising a siloxane structure, and surface resistance of the polymer surface layer is 10E10Ω/□ or less.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
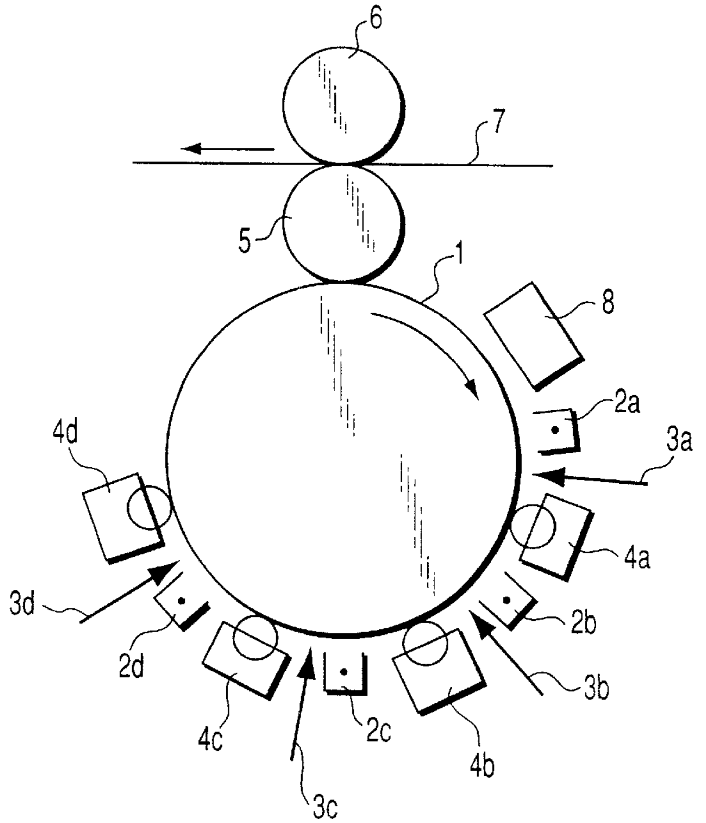
FIG. 1 is a view showing a structure of an electrophotographic image formation apparatus using a liquid toner.

Now, the present invention will be further explained in detail.

In the transfer medium for use in the image formation apparatus, the surface layer contains a polymer having a backbone comprising a siloxane structure as a binder resin and whose surface resistance is set at 10E10Ω/□ or less. If the surface resistance of the surface layer exceeds this value, a sufficient electric field is not applied to the surface layer when the toner image on the photosensitive body is transferred onto the transfer medium by application of the electric field. As a result, an image cannot be transferred with an efficiency of close to 100%.

The polymer (silicone resin) serving as a binder resin and having a backbone comprising a siloxane structure may have a linear structure or a cyclic structure. The silicon atom contained in a polymer main chain may have two substituents. As the substituent group, an alkyl group, an aryl group, and an aralkyl group may be introduced.

In the present invention, to impart the conductivity to the surface layer, a conductive filler is added to the silicone resin. As the conductive filler, a metal, a metal oxide, a conductive carbon, and a conducive plastic may be mentioned. Of them, the metal oxide may be preferably used. The reason is that the conductive fillers except the metal oxide are usually colored, with the result that reflectivity will be lowered when the presence and absence of the toner on the transfer medium is optically detected. However, if such a detection method is not employed, the conductive fillers except the metal oxide may be used.

To increase the reflectivity of the surface conductive silicone layer of the transfer medium, it is preferable to use a white or a nearly white metal oxide filler. As the metal oxide of this type, titanium oxide, tin oxide, and indium oxide are suitable. However, since titanium oxide itself has a low conductivity, it is preferable to treat it with a conductive oxide such as tin oxide or indium oxide. In this case, antimony or the like may be doped to the metal oxide (e.g., tin oxide) to be used for the aforementioned treatment. Alternatively, the surface of the metal oxide filler may be treated so as to facilitate its dispersion.

In the present invention, to reduce an amount of a hydrocarbon-based carrier solvent absorbed by the conductive silicone layer, it is effective to define a shape of the conductive filler made of a metal oxide.

For example, it is preferable to use a granular conductive filler made of a metal oxide, primary grains of which have a spherical shape having a size of 0.1 μm or less and an aspect ratio of 2 or less. If the size of the primary grain of the granular filler is 0.1 μm or less, a highly conductive silicone layer can be obtained even if the addition amount of the filler is low. In addition, the surface of the silicone layer becomes smooth. Furthermore, since the conductive filler is densely packed within the silicone layer, the permeation amount of the carrier solvent can be greatly reduced.

On the other hand, it is effective to use a filament-like conductive filler made of a metal oxide having a minor axis of 0.2 μm or less and an aspect ratio of 5 or more. If the filament-like filler is used, a highly conductive silicone layer can be obtained even if the addition amount is low. Furthermore, when the silicone resin containing the filament-like filler is coated and cured, the major axis of the filament-like filler is arranged along a film surface direction and the minor axis thereof is arranged along a film thickness direction. As a result, the surface of the silicone layer becomes smooth. The conductive filler is densely packed within the silicone layer. It is therefore possible to greatly reduce the permeation amount of the carrier solvent.

The content of the conductive filler in the silicone layer is preferably 5 to 50% by weight. If the content of the conductive filler is extremely low, it is impossible not only to impart a sufficient conductivity to the silicone layer but also to provide a sufficient effect of reducing the absorption amount of the solvent. On the other hand, if the content of the conductive filler is excessively high, the transfer medium is reduced in efficiency in transferring the toner to the image formation medium such as a paper sheet.

To disperse the conductive filler made of a metal oxide into the silicone resin serving as a binder, an attritor, a sand-grinder, a ball-mill, a three-role, a paint-shaker, a nanomizer, or a homogenizer may be used.

The thickness of the conductive silicone layer is preferably from 0.1 to 10 μm, and more preferably, 0.1 to 3 μm. If the thickness is extremely thin, the silicone resin cannot sufficiently cover the filler added thereto. If the thickness is extremely thick, the conductive silicone layer cannot follow the motion of the underlying layer (e.g., conductive rubber layer). As a result, the conductive silicone layer is easily peeled off. Furthermore, it is preferable that the conductive silicone layer be flexible enough to follow the motion of the underlying layer. If the conductive silicone layer is rigid, it may be broken or peeled off since it cannot follow a deformation of the underlying conductive rubber layer when the conductive rubber layer is deformed by a load.

Figure 2:
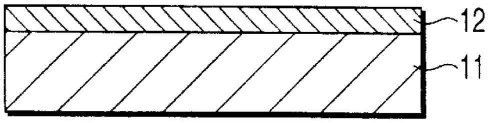
FIG. 2 is a cross-sectional view showing a structure of a transfer medium according to the present invention.

FIG. 2 shows the most simple structure of the transfer medium according to the present invention. In the transfer medium, a conductive silicone layer 12 is formed on the conductive rubber layer 11. As the conductive rubber layer 11, a nitril-based rubber such as NBR and a chlorohydrin-based rubber, which are highly resistant to a solvent, are usually used.

The conductive silicone layer 12 may be formed on the conductive rubber layer 11 by applying a liquid coating of the nitril-based rubber or the chlorohydrin-based rubber to, for example, the roller main body, followed by curing it. Alternatively, the conductive silicone layer 12 may be formed by applying the liquid coating to the surface of the conductive rubber layer formed into a cylindrical seamless belt, followed by curing it, and then fit into the roller main body.

As described, the surface resistance of the conductive silicone layer 12 is set at 10E10Ω/□ or less. Furthermore, in the image formation apparatus using a liquid toner, a bias voltage is applied through the conductive rubber layer 11 and the conductive silicone layer 12. It is therefore preferable that an overall volume resistance of the conductive rubber layer 11 and the conductive silicone layer 12 be low.

The volume resistance may be set at 10E11Ω·cm or less, preferably, 10E10Ω·cm or less, and more preferably, 10E9 Ω·cm or less.

In the present invention, the surface resistance of the conductive silicone layer 12, and the overall volume resistance of the conductive rubber layer 11/the conductive silicone layer 12 can be measured by a megohmmeter (megger). Alternatively, the surface resistance of the conductive silicone layer 12 can be measured by a method shown in FIG. 7, and the overall volume resistance of the conductive rubber layer 11 and the conductive silicone layer 12 can be measured by a method shown in FIG. 8.

Figure 7:
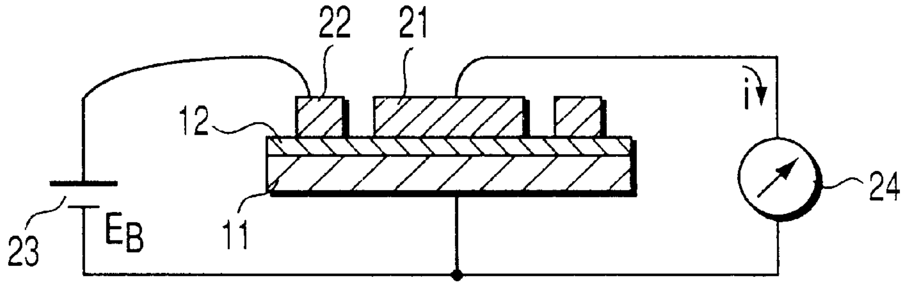
FIG. 7 is a diagrammatic view showing a measurement method for surface resistance of a transfer medium according to the present invention.
Figure 8:
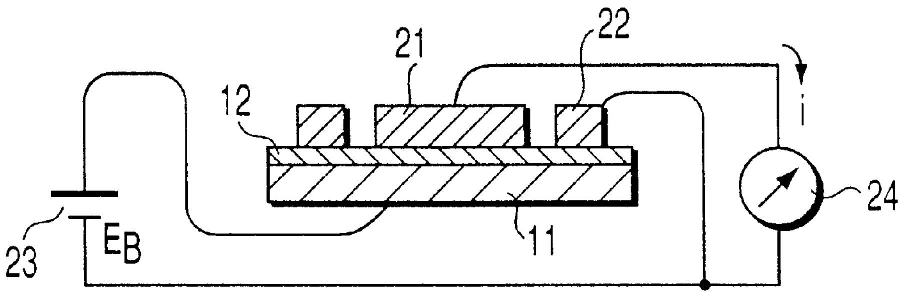
FIG. 8 is a diagrammatic view showing a measurement method for volume resistance of a transfer medium according to the present invention.

In FIGS. 7 and 8, a sample formed of a laminate of a conductive rubber layer 11 and a conductive silicone layer 12 is prepared. A disc electrode 21 having a diameter of $D_1$ and a ring electrode 22 having an inner diameter of $D_2$ ($D_2$>$D_1$) are disposed on the conductive silicone layer 12. The conductive rubber layer 11 is used as a counter electrode.

In order to measure the surface resistance of the conductive silicone layer 12, a power source 23, an ammeter 24, the disc electrode 21, the ring electrode 22 and the conductive rubber layer 11 as a counter electrode are connected as shown in FIG. 7. When a voltage $E_B$ is applied between the ring electrode 22 and the disc electrode 21, a current i flows. The surface resistance $R_S$ of the conductive silicone layer 12 is represented by the following equation.

$$R_s = E_B / i$$

Further, the surface resistivity $\rho_S$ is determined by the following equation.

$$\rho s = Rs \frac{\pi(D_2 + D_1)}{D_2 - D_1}$$

In order to measure the overall volume resistance of the conductive rubber layer 11/the conductive silicone layer 12, the power source 23, the ammeter 24, the disc electrode 21, the ring electrode 22 and the conductive rubber layer 11 are connected as shown in FIG. 8. When a voltage $E_B$ is applied between the disk electrode 21 and the conductive rubber layer 11, a current i flows. Because the potential of the ring electrode 22 is set to 0V, a current flows the surface of conductive silicone layer 12 does not flow to the ammeter 24. The volume resistance $R_v$ of the conductive rubber layer 11/the conductive silicone layer 12 is represented by the following equation.

$$R_v = E_B / i$$

Further, the volume resistivity $\rho_v$ is determined by the following equation:

$$\rho_v = R_v \times S / t$$

where, S is an effective area of the disk electrode 21, and t is a thickness of the sample.

The overall thickness of the conductive rubber layer 11/the conductive silicone layer 12 is defined depending upon the pressure for transferring the toner onto a paper. In general, the overall thickness preferably falls within 0.5 mm to 3 mm. If the entire thickness is extremely thin, it is impossible to relieve the pressure applied during the transfer process, with the result that the pressure has an adverse effect upon the image. For example, a defaced image is formed. Conversely, if the entire thickness is extremely thick, the pressure applied during the transfer process is dispersed; at the same time, the amount of rubber deformation is increased. An adverse effect is also brought upon the image.

The overall rubber hardness of the conductive rubber layer 11 and the conductive silicone layer 12 is measured by a method (durometer hardness type A) in accordance with JIS 65234. It is preferable that the hardness fall within the range of A 40 to 70 degrees. According to the JIS measurement method, the rubber must have a thickness of 6 mm or more. However, if the rubber is measured by being placed on a sufficiently rigid flat board, the thickness of the rubber may be thin. In the case where the rubber has a roller form or a belt form, even if the overall rigidity is increased by using a thick rubber having a hardness as high as over A70 degrees, it is possible to suppress the amount of rubber deformation. However, in the case where the sheet-type rubber is wound around a cylindrical roller, it is preferable not to use hard and thick rubber. This is because the sheet-type rubber made of hard and thick rubber may not follow the curvature of the roller.

Figure 3:
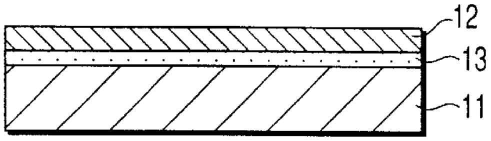
FIG. 3 is a cross-sectional view showing a structure of a transfer medium according to the present invention.

As shown in FIG. 3, a primer layer 13 may be provided between the conductive rubber layer 11 and the conductive silicone layer 12 to increase adhesive strength between them. It is particularly preferable if the primer layer 13 is low in solvent absorption ability and capable of preventing a solvent from permeating into the conductive rubber layer 11. Incidentally, if the primer layer 13 is as sufficiently thin as 1 μm or less, the bias voltage to be applied to the conductive silicone layer 12 will not decrease.

Figure 4:
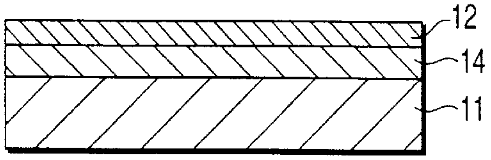
FIG. 4 is a cross-sectional view showing a structure of a transfer medium according to the present invention.

As shown in FIG. 4, one of surfaces of the conductive rubber layer (solid layer) 11 may be formed of a foam layer (sponge layer) 14. The foam layer (sponge layer) 14 may be provided on both surfaces of the solid layer or at the center of the solid layers.

Figure 5:
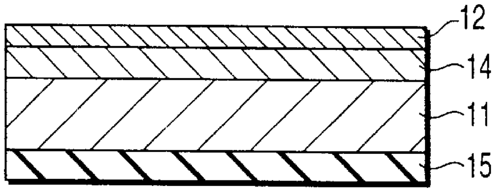
FIG. 5 is a cross-sectional view showing a structure of a transfer medium according to the present invention.

As shown in FIG. 5, to improve mechanical strength and to suppress elongation of the layer in the structure shown in FIG. 4, a base cloth 15 made of a low-extensible fiber may be laminated.

Figure 6:
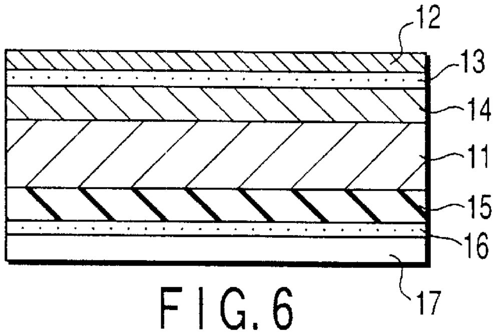
FIG. 6 is a cross-sectional view showing a structure of a transfer medium according to the present invention.

Furthermore, when the sheet having a structure shown in FIG. 5 is adhered onto the surface of the roller, an adhesive 16 for use in adhering the sheet to a metal drum is applied on a rear side of the base cloth 15, as shown in FIG. 6. If the rubber layer is exchanged in its entirety, the adhesive must adhere to the metal drum with a sufficient strength but must not remain on the metal drum when removed. Note that even if the adhesive is hard to be removed at ambient temperature but can be removed by heating, it may be used. It is preferable that the adhesive 16 be protected by a protection sheet 17 or a protection film before use.

EXAMPLES

Now, examples of the present invention will be explained.

Example 1

To a low-temperature curable silicone resin (manufactured by Torey Dow-Corning Silicone, SR-2316), conductive titanium oxide (manufactured by Ishihara Sangyo, ET-300W) having an average size of 0.03 to 0.06 μm was added in an amount of 30 wt % and mixed by a paint shaker for 3 hours. In this manner, a coating was prepared.

After the coating thus prepared was applied to a cylindrical NBR belt having an inner diameter of 50 mm (volume resistance: 10E8Ω·cm) in a thickness of about 1 μm, the coating was cured by heating at 100° C. for one hour. In this manner, a transfer belt was formed. The surface resistance of the transfer belt was about 10E8Ω/□, as measured by a megohmmeter (megger) (manufactured by Yokogawa Electric Corporation, 3213–24 type).

The transfer belt was fitted over a transfer roller main body of 50 mm in diameter to manufacture a transfer roller. The transfer roller was arranged on a photosensitive body so as to face it with a gap of 100 μm. In this manner, the image formation apparatus shown in FIG. 1 was formed. While the photosensitive body and the transfer roller were rotated at an equal speed, a transfer voltage of 400V was applied. The toner developed on the photosensitive roller was transferred to the transfer roller, and then transferred to a paper sheet. As a result, the toner was transferred from the photosensitive body onto the transfer roller with an efficiency of 100%. Furthermore, the toner was transferred to the paper sheet with an efficiency of 100%.

Incidentally, if titanium oxide fine particles are added to a silicone resin in an amount of 5 to 50 wt %, the surface resistance of the surface layer of the transfer belt can be 10E10Ω/□ or less and the transfer rate to the paper sheet at 90% or more.

Example 2

The conductive silicone coating prepared in Example 1 was applied to a cylindrical conductive polyimide belt (volume resistance: 10E8Ω·cm) having a diameter of 50 mm. The conductive polymide belt was fitted over a transfer roller main body, which was formed by fitting silicone rubber of 5 mm thick around a core metal having a diameter of 40 mm, without providing a clearance so as not to slip from each other. The transfer roller was arranged on the photosensitive body so as to face it with a gap of 100 μm. While the photosensitive body and the transfer roller were rotated at an equal speed, the transfer voltage of 400V was applied. The toner developed on the photosensitive body was transferred to the transfer roller and further transferred from the transfer roller to a paper sheet. As a result, the toner was transferred from the photosensitive body to the transfer roller with an efficiency of 100% and to the paper sheet with an efficiency of 100%.

Example 3

To a low-temperature curable silicone resin (manufactured by Torey Dow-Corning Silicone, SR-2316), filament-like conductive titanium oxide (manufactured by Ishihara Sangyo, FT-1000) having a major axis of about 1.7 μm and an aspect ratio of 12 was added in an amount of 20 wt % and mixed by a paint shaker for 3 hours. In this manner, a coating was prepared.

The coating thus prepared was applied to a conductive epichlorohydrin rubber sheet in a thickness of about 2 μm, and then it was cured by heating at 100° C. for one hour. In this manner, a transfer sheet was prepared. The conductivity of the transfer sheet was about 200 MΩ, as measured by a megohmmeter (megger). The transfer sheet was adhered onto the surface of the transfer roller main body to form a transfer roller. The transfer roller was arranged on the photosensitive body so as to face it with a gap of 100 μm. While the photosensitive body and the transfer roller were rotated at an equal speed, a transfer voltage of 400V was applied. The toner developed on the photosensitive body was transferred to the transfer roller and further transferred to a paper sheet. As a result, the toner was transferred onto the transfer roller from the photosensitive roller with an efficiency of 100% and further onto the paper sheet with an efficiency of 100%.

Example 4

Unlike in Example 1, in this example, a transfer belt of 53 mm in diameter was fitted over a transfer roller main body of 50 mm in diameter, thereby forming a transfer roller having a clearance between the transfer belt and the transfer roller main body. The transfer roller was in elastic contact with the photosensitive body without load and in rigid contact with the paper sheet with a load of 5 kg/cm.

The transfer roller was arranged on the photosensitive body so as to face it with a gap of 100 μm. While the photosensitive body and the transfer roller were rotated at an equal speed, a transfer voltage of 400V was applied. The toner developed on the photosensitive body was transferred to the transfer roller and further transferred to a paper sheet. As a result, the toner was transferred from the photosensitive body to the transfer roller with an efficiency of 100% and further transferred to a paper sheet with an efficiency of 100%. Furthermore, the image obtained in this example has a higher quality than in other examples.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image formation apparatus comprising:

a photosensitive body; and a transfer medium receiving an image made of a liquid toner formed on the photosensitive body and further transferring the image to an image formation medium, wherein the transfer medium has a polymer surface layer, the polymer surface layer comprises a polymer having a backbone comprising a siloxane structure, and surface resistance of the polymer surface layer is 10E10 Ω/□ or less.

2. The apparatus according to claim 1, wherein the polymer surface layer contains a conductive metal oxide.

3. The apparatus according to claim 2, wherein the transfer medium has a structure in which a conductive rubber layer and the polymer surface layer are formed on a surface of a roller main body, and the polymer surface layer is made of a silicone resin containing the conductive metal oxide.

4. The apparatus according to claim 2, wherein the conductive metal oxide is selected from the group consisting of titanium oxide, tin oxide and indium oxide.

5. The apparatus according to claim 2, wherein primary grains of the conductive metal oxide have a spherical shape having a size of 0.1 μm or less and an aspect ratio of 2 or less.

6. The apparatus according to claim 2, wherein the conductive metal oxide has a filament shape having a minor axis of 0.2 μm or less and an aspect ratio of 5 or more.

7. The apparatus according to claim 2, wherein a content of the conductive metal oxide in the polymer surface layer is 5 to 50% by weight.

8. The apparatus according to claim 1, wherein a thickness of the polymer surface layer is 0.1 to 10 μm.

9. The apparatus according to claim 8, wherein a thickness of the polymer surface layer is 0.1 to 3 μm.

10. The apparatus according to claim 3, wherein an overall volume resistance of the conductive rubber layer and the polymer surface layer is 10E11 Ω·cm or less.

11. The apparatus according to claim 10, wherein the volume resistance is 10E9 Ω·cm or less.

12. An image formation apparatus comprising:

a photosensitive body; and a transfer medium receiving an image made of a liquid toner formed on the photosensitive body and further transferring the image to an image formation medium, wherein the transfer medium has a polymer surface layer, the polymer surface layer comprises a polymer having a backbone comprising a siloxane structure, and surface resistance of the polymer surface layer is 10E10 Ω/□ or less, and wherein the polymer surface layer contains a conductive metal oxide.

13. An image formation apparatus comprising:

a photosensitive body; and a transfer medium receiving an image made of a liquid toner formed on the photosensitive body and further transferring the image to an image formation medium, wherein the transfer medium has a polymer surface layer, the polymer surface layer comprises a polymer having a backbone comprising a siloxane structure, and surface resistance of the polymer surface layer is 10E10 Ω/□ or less, wherein the polymer surface layer contains a conductive metal oxide, and wherein primary grains of the conductive metal oxide have a spherical shape having a size of 0.1 μm or less and an aspect ratio of 2 or less.

14. An image formation apparatus comprising:

a photosensitive body; and a transfer medium receiving an image made of a liquid toner formed on the photosensitive body and further transferring the image to an image formation medium, wherein the transfer medium has a polymer surface layer, the polymer surface layer comprises a polymer having a backbone comprising a siloxane structure, and surface resistance of the polymer surface layer is 10E10 Ω/□ or less, and wherein the polymer surface layer contains a conductive metal oxide, and wherein the conductive metal oxide has a filament shape having a minor axis of 0.2 μm or less and an aspect ratio of 5 or more.

15. A transfer medium receiving an image made of a liquid toner formed on a photosensitive body and further transferring the image to an image formation medium, wherein the transfer medium has a polymer surface layer, the polymer surface layer comprises a polymer having a backbone comprising a siloxane structure, and surface resistance of the polymer surface layer is 10E10 Ω/□ or less, wherein the polymer surface layer contains a conductive metal oxide, and wherein primary grains of the conductive metal oxide have a spherical shape having a size of 0.1 μm or less and an aspect ratio of 2 or less.

16. The transfer medium according to claim 15, wherein the transfer medium has a structure in which a conductive rubber layer and the polymer surface layer are formed on a surface of a roller main body, and the polymer surface layer is made of a silicone resin containing the conductive metal oxide.

17. The transfer medium according to claim 15, wherein the conductive metal oxide is selected from the group consisting of titanium oxide, tin oxide and indium oxide.

18. The transfer medium according to claim 15, wherein a content of the conductive metal oxide in the polymer surface layer is 5 to 50% by weight.

19. The transfer medium according to claim 15, wherein a thickness of the polymer surface layer is 0.1 to 10 μm.

20. The transfer medium according to claim 19, wherein a thickness of the polymer surface layer is 0.1 to 3 μm.

21. The transfer medium according to claim 15, wherein an overall volume resistance of the conductive rubber layer and the polymer surface layer is 10E11 Ω·cm or less.

22. The transfer medium according to claim 21, wherein the volume resistance is 10E9 Ω·cm or less.

23. A transfer medium receiving an image made of a liquid toner formed on a photosensitive body and further transferring the image to an image formation medium, wherein the transfer medium has a polymer surface layer, the polymer surface layer comprises a polymer having a backbone comprising a siloxane structure, and surface resistance of the polymer surface layer is 10E10 Ω/□ or less, wherein the polymer surface layer contains a conductive metal oxide, and wherein the conductive metal oxide has a filament shape having a minor axis of 0.2 μm or less and an aspect ratio of 5 or more.

24. The transfer medium according to claim 23, wherein the transfer medium has a structure in which a conductive rubber layer and the polymer surface layer are formed on a surface of a roller main body, and the polymer surface layer is made of a silicone resin containing the conductive metal oxide.

25. The transfer medium according to claim 23, wherein the conductive metal oxide is selected from the group consisting of titanium oxide, tin oxide and indium oxide.

26. The transfer medium according to claim 23, wherein a content of the conductive metal oxide in the polymer surface layer is 5 to 50% by weight.

27. The transfer medium according to claim 23, wherein a thickness of the polymer surface layer is 0.1 to 10 μm.

28. The transfer medium according to claim 27, wherein a thickness of the polymer surface layer is 0.1 to 3 μm.

29. The transfer medium according to claim 23, wherein an overall volume resistance of the conductive rubber layer and the polymer surface layer is 10E11 Ω·cm or less.

30. The transfer medium according to claim 29, wherein the volume resistance is 10E9 Ω·cm or less.

* * * * *